Jan. 2, 1962 L. NATONEK 3,015,769
SELF-DRIVING VIBRATING CAPACITOR WITH AN AUXILIARY ELECTRODE
Filed July 23, 1959 2 Sheets-Sheet 1

INVENTOR.
László Natonek
BY
ATTORNEYS

United States Patent Office 3,015,769
Patented Jan. 2, 1962

3,015,769
SELF-DRIVING VIBRATING CAPACITOR WITH AN AUXILIARY ELECTRODE
László Natonek, 3 Sallai Imre Utca, Budapest XIII, Hungary
Filed July 23, 1959, Ser. No. 829,023
Claims priority, application Hungary Aug. 27, 1958
3 Claims. (Cl. 318—128)

The invention relates to a vibrating capacitor which, in addition to the two electrodes adapted for converting a direct current voltage to an alternating current voltage, is also provided with a third electrode. The invention also covers the circuits of such a vibrating capacitor.

A known construction of a direct current valve voltmeter of high input resistance is the voltage converter device operating with a vibrating capacitor.

Figure 1:
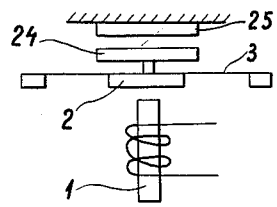
Figure 2:
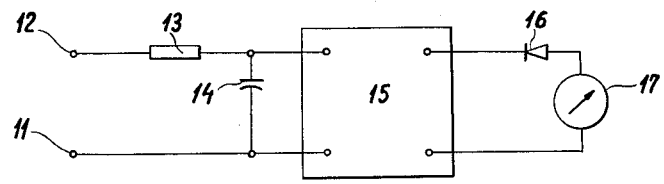
Figure 3:
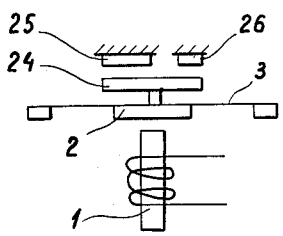
Figure 4:
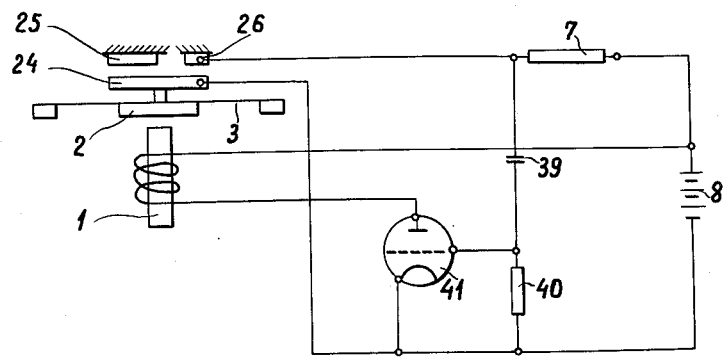

The drawings will serve for a more detailed explanation. In these drawings:

FIGURE 1 shows the principle of construction of the known vibrating capacitor,

FIGURE 2 a block diagram of the known direct current valve voltmeter operating with a vibrating capacitor, FIGURE 3 an embodiment of the vibrating capacitor according to the invention, by way of example, FIGURE 4 another circuit for the vibrating capacitor according to the invention, by way of example.

In FIGURE 1, the resilient mounting 3 is stretched over the electromagnet 1. On said mounting, is fixed the iron plate 2 and the movable electrode 24 cooperating with the measuring electrode 25. The two latter form the vibrating capacitor. If, now, an alternating current flows through the winding of the electromagnet 1, due to the effect of the force exerted on the iron plate 2, the resilient mounting 3 together with the electrode 4 makes a periodical vibratory movement, corresponding in beat and amplitude to the alternating current. Consequently, the capacitance of the vibrating capacitor varies within two limit values corresponding to the movement. If an electric charge Q arrives at the two electrodes of the vibrating capacitor, the voltage produced on the two electrodes is $$E = \frac{Q}{C}$$

If the capacitance C is varied periodically, the voltage E varies with a frequency corresponding to that of the capacitance variation, the variation being greater, the greater is the electric charge Q and the variation of the capacitance C. In this way, part of the direct current voltage E is converted into alternating current, and this part is greater, the greater is the ratio of the limit values of the capacitance variation.

If, therefore, the magnitude of the periodical capacitance variation is constant, the value of the alternating current produced on the electrodes of the vibrating capacitor will be proportional to the electric charge Q.

FIGURE 2 shows a simplified block diagram of a direct current valve voltmeter operating with such a vibrating capacitor. The direct current source which is to be measured and which is connected to the input terminals 11 and 12, charges, through the resistance 13 the vibrating capacitor 14, in which is produced, in rhythm with its vibration, an alternating current voltage proportional to the charge, which is amplified by the alternating current amplifier 15 and is rectified by the rectifier 16, and the direct current passing through the measuring instrument 17 causes the pointer of the instrument to be deflected. If the gain of the amplifier 15 and the amplitude of the vibrating capacitor are constant, the deflection of the instrument 17 is proportional to the voltage across the terminals 11 and 12 and which is to be measured.

Vibrating capacitors are, however, subject to the error that, if the amount of the capacitance variation varies for any reason, for example due to variation of the alternating current flowing through the electromagnet, the resulting alternating current voltage and hence the deflection of the instrument 17 lose their proportionality to the direct current voltage to be measured, so that therefore the valve voltmeter no longer indicates the correct value.

It is the object of the invention to eliminate this error. Due to the provision of an auxiliary electrode 26, which is shown by way of example in FIGURE 3, and which together with the vibrating electrode 24 forms the two electrodes of an auxiliary capacitor, the capacitance of this auxiliary capacitor varies in the same proportion as that of the vibrating capacitor 24—25. Approximately constant charge between the electrodes 24 and 26 is ensured by the battery 8 and the resistance 7 of FIG. 4, the alternating current voltage produced is proportional to the movement, and in this way it is adapted to maintain constant the amplitude of the vibrating capacitor.

The auxiliary electrode according to the invention also makes it possible for the vibrating system to vibrate at its natural frequency by self-excitation, the amplitude being kept constant.

FIGURE 5 shows a construction for this purpose by way of example. If the vibrating electrode 24 for any reason (for example valve noise) leaves its position of rest and approaches for example the auxiliary electrode 26, the voltage on the auxiliary capacitor is diminished, which is equivalent to a negative pulse arriving, by means of the capacitor 39 and the grid leak 40, at the grid of the electronic valve 41 acting as amplifier, or in the case of the use of a plurality of electronic valves, at the grid of the last valve, in which case the anode current of the electronic valve 41 acting as amplifier, or in the case of the use of a plurality of valves, the anode current of the last valve is diminished, and at the same time the pull exerted on the iron plate fixed to the resilient mounting 3 becomes smaller, and the vibrating system moves away from the electromagnet. The capacitance of the auxiliary capacitor consisting of the electrodes 24, 26 is thereby further increased, while the electric voltage on it is diminished until the spring power acting on the mechanical vibrating system consisting of the mounting 3, iron plate 2 and vibrating electrode 24 begins to return the vibrating system to its position of rest. In this case, the capacitance of the electrodes 24, 26 is diminished, the voltage on them being increased, and a positive pulse arrives at the grid of the electronic valve 41 acting as amplifier, or in the case of the use of a plurality of valves, on the grid of the first valve. Consequently, the anode current (in the case of the use of a plurality of valves, the anode current of the last valve) is increased, and together with it the pull, the movement being assisted by the electronic valve or amplifier. If now the positive electromechanical feedback established in this way by means of the auxiliary electrode 26 is sufficient, the system will vibrate at its natural frequency. Amplitude limitation of the vibrating system will be effected by the air cushion between the electrodes 24 and 25 and 24 and 26, by means of which, in the event of an increase in vibration, the damping of the vibrating system will be increased, thereby determining an approximately constant amplitude, due to variation of the damping.

I claim:
1. In a vibrating condenser inverter, for use in in- verting a unidirectional current into alternating current, and of the type including a fixed condenser main plate, a movable condenser main plate, alternating current energized vibrating means connected to said movable plate, and a source of A.C. potential connected to said vibrating means to vibrate said movable plate with an amplitude and frequency corresponding to that of said source of A.C. potential: the improvement comprising an auxiliary condenser plate fixed relative to and electrically isolated from one of said condenser main plates and forming, with the other condenser main plate, an auxiliary condenser; means, including a source of direct current potential, operable to apply a substantially constant charge to said auxiliary condenser to produce an A.C. signal voltage proportional to the vibration of said vibrating condenser; modulating means interposed between said source of A.C. potential and said vibrating means; and means operable to apply said A.C. signal voltage to said modulating means to modulate the A.C. potential applied to said vibrating means in accordance with said A.C. signal voltage.

2. The improvement claimed in claim 1 in which said modulating means includes an amplifier having said vibrating means connected in its output circuit; said A.C. signal voltage being impressed across a resistor connected across the input circuit of said amplifier.

3. The improvement claimed in claim 1 in which said vibrating means is an electromagnet; said modulating means including an amplifier having said electromagnet included in its output circuit; said modulating means, in cooperation with said auxiliary condenser, constituting an electro mechanical feed-back exciting the vibrating condenser to its natural frequency of mechanical vibration.

References Cited in the file of this patent
UNITED STATES PATENTS

| | | |
|---|---|---|
| 2,287,406 | Baird | June 23, 1942 |
| 2,297,084 | Swallow | Sept. 29, 1942 |
| 2,372,062 | Dorsman | Mar. 20, 1945 |
| 2,658,173 | Reese | Nov. 3, 1953 |
| 2,766,413 | Young | Oct. 9, 1956 |